United States Patent
Attard et al.

(10) Patent No.: US 12,037,936 B1
(45) Date of Patent: Jul. 16, 2024

(54) TURBOCHARGER INCORPORATING OIL SHUTOFF CONTROL BASED ON A COLD LIGHT OFF CATALYST

(71) Applicant: FCA US LLC, Auburn Hills, MI (US)

(72) Inventors: William Attard, Brighton, MI (US); Filip Vucak, Windsor (CA); Michael Barkey, Maidstone (CA); Jeongyong Choi, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,081

(22) Filed: Dec. 1, 2023

(51) Int. Cl.
| | | |
|---|---|---|
| *F02B 37/18* | (2006.01) | |
| *F01M 1/16* | (2006.01) | |
| *F02B 39/14* | (2006.01) | |
| *F02D 41/00* | (2006.01) | |
| *F01N 3/10* | (2006.01) | |

(52) U.S. Cl.
CPC ............. *F02B 37/183* (2013.01); *F01M 1/16* (2013.01); *F02B 39/14* (2013.01); *F02D 41/0007* (2013.01); *F01N 3/105* (2013.01); *F01N 2430/06* (2013.01)

(58) Field of Classification Search
CPC .... F02B 37/183; F02B 39/14; F01N 2430/06; F01N 3/105; F02D 41/0007
See application file for complete search history.

(56) References Cited

U.S. PATENT DOCUMENTS

| 2011/0011082 A1* | 1/2011 | Mehta ..................... F02B 37/18 60/299 |
| 2012/0017587 A1* | 1/2012 | Yoshida .................. F01N 3/101 60/602 |
| 2014/0109553 A1* | 4/2014 | Roberts, Jr. ......... F01N 13/0093 60/274 |
| 2017/0328263 A1* | 11/2017 | Uhrich ................... F02M 26/06 |
| 2020/0095913 A1* | 3/2020 | Rohde ..................... F01N 3/208 |

FOREIGN PATENT DOCUMENTS

| DE | 102017105639 A1 * | 9/2017 | ......... F01N 13/0097 |
| DE | 102017209743 A1 * | 12/2018 | ......... F01N 13/0093 |

* cited by examiner

*Primary Examiner* — Ngoc T Nguyen
(74) *Attorney, Agent, or Firm* — Jeremy J. Klobucar

(57) ABSTRACT

A control system for an engine comprising a turbocharger includes a cold light off catalyst (CLOC), a CLOC valve, an oil control valve and a controller. The CLOC is positioned in a bypass passage around a turbine of the turbocharger. The CLOC valve selectively routes exhaust flow from the engine between the turbine and the CLOC. The oil control valve regulates lubrication oil from the engine to the turbocharger. The controller is configured to command the CLOC valve to a first position whereby exhaust flow is routed to the CLOC in a CLOC mode; determine, based on operation in the CLOC mode, a pressure of the turbine of the turbocharger; compare the determined pressure to a pressure threshold; determine a target position of the oil control valve to mitigate oil leakage from the turbocharger during CLOC operation; and command the oil control valve to the target position.

16 Claims, 3 Drawing Sheets

TURBOCHARGER INCORPORATING OIL SHUTOFF CONTROL BASED ON A COLD LIGHT OFF CATALYST

FIELD

The present application generally relates to turbochargers and, more particularly, to techniques for controlling an oil control valve that communicates oil from an engine to the turbocharger based on operation of a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350 C depending on catalyst formulation. Typically, at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a cold light off catalyst (CLOC), a CLOC valve, an oil control valve and a controller. The CLOC is positioned in a bypass passage around a turbine of the turbocharger. The CLOC valve selectively routes exhaust flow from the engine between the turbine and the CLOC. The oil control valve regulates lubrication oil from the engine to the turbocharger. The controller is configured to command the CLOC valve to a first position whereby exhaust flow is routed to the CLOC in a CLOC mode; determine, based on operation in the CLOC mode, a pressure of the turbine of the turbocharger; compare the determined pressure to a pressure threshold; determine a target position of the oil control valve to mitigate oil leakage from the turbocharger during CLOC operation; and command the oil control valve to the target position.

In some implementations, the controller is configured to command the CLOC valve to a position wherein all exhaust flow is directed to the CLOC.

In other implementations, the controller is configured to command the oil control valve to an open position based on a determination that the determined pressure is not less than the pressure threshold.

In additional implementations, the pressure threshold is indicative of a vacuum condition within the turbocharger. In examples, the target position comprises a completely closed position wherein oil is precluded from entering the turbocharger from the engine. In other examples, the target position comprises a partially closed position wherein oil flow leakage from the turbocharger into the aftertreatment is reduced.

In implementations, determining the pressure of the turbine of the turbocharger comprises receiving a signal from a pressure sensor (or modelled pressure) indicative of the pressure of the turbine.

In some implementations, determining the pressure of the turbine of the turbocharger comprises estimating the pressure of the turbine based on operating conditions.

According to another example aspect of the invention, a method for controlling an engine comprising a turbocharger includes commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode; determining, based on operation in the CLOC mode, a pressure of the turbine of the turbocharger; comparing the determined pressure to a pressure threshold; determining, based on the comparison, a target position of an oil control valve to mitigate oil leakage from the turbocharger during CLOC operation, the oil control valve regulating lubrication oil from the engine to the turbocharger; and commanding the oil control valve to the target position.

In some implementations, the method further comprises commanding the CLOC valve to a position wherein all exhaust flow is directed to the CLOC.

In other implementations, the method further comprises commanding the oil control valve to an open position based on a determination that the determined pressure is not less than the pressure threshold.

In additional implementations, the pressure threshold is indicative of a vacuum condition within the turbocharger.

In additional implementations, the target position comprises a completely closed position wherein oil is precluded from entering the turbocharger from the engine.

In additional implementations, the target position comprises a partially closed position wherein oil flow leakage from the turbocharger into the aftertreatment is reduced.

In additional implementations, determining the pressure of the turbine of the turbocharger comprises receiving a signal from a pressure sensor indicative of the pressure of the turbine.

In additional implementations, determining the pressure of the turbine of the turbocharger comprises estimating the pressure of the turbine based on operating conditions.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. A system and related techniques are described for controlling a cold start light off catalyst (CLOC) where a CLOC valve is controlled to divert exhaust gas from the turbine of the turbocharger and through a small catalyst which can achieve high efficiency quickly, while a much larger downstream catalyst is warming up. An oil control valve is added to regulate lubrication oil from the engine to the turbocharger during CLOC operation. The oil control valve is used to mitigate oil leaking between the turbine and turbocharger body that can occur when vacuum conditions arise due to full rerouting of the exhaust from the turbocharger and to the CLOC.

Figure 1:
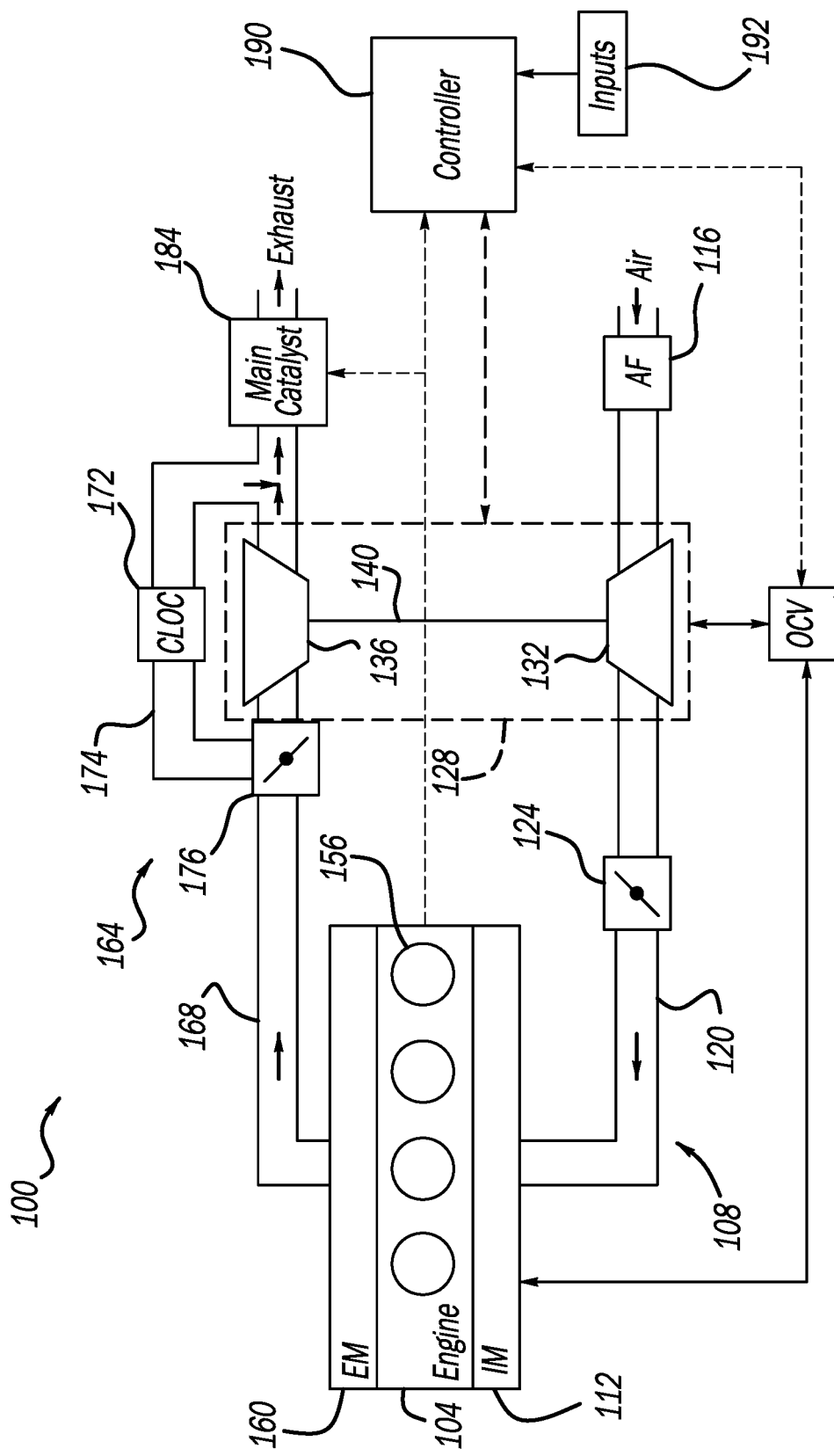
FIG. 1 is a diagram of an example vehicle comprising a turbocharged engine incorporating a cold light off catalyst (CLOC) and an oil control valve according to the principles of the present disclosure.

Referring now to FIG. 1, a diagram of an example vehicle control system 100 is illustrated. The vehicle control system 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140. An oil control valve 144 regulates lubrication oil from the engine 104 to the turbocharger 128 as will be described in greater detail herein.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172. As used herein a "CLOC mode" is used to refer to the controller 190 commanding the CLOC valve 176 to rout at least some exhaust to the CLOC 172.

A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly such as when the main catalyst 184 has yet to reach optimal operating temperature.

The oil control valve 144 regulates lubrication oil from the engine 104 to the turbocharger 128 during CLOC operation. In examples, the oil control valve 144 receives oil from the engine 104 at the sump. The turbocharger 128 receives oil from the oil pump on the engine 104. The oil pump draws the oil from the sump. The turbocharger 128 then drains the oil back to the sump. The oil is used to lubricate components of the turbocharger 128.

A controller, also referred to herein as an engine controller, 190 controls operation of the vehicle control system 100. Examples of components controlled by the controller 190 include the engine 104, the throttle valve 124, the CLOC valve 176, and the oil control valve 144. It will be appreciated that the controller 190 controls specific components of the vehicle control system 100 that are not illustrated, such as, but not limited to, fuel injectors, spark plugs, an EGR valve, a VVC system (e.g., intake/exhaust valve lift/ actuation), a transmission, and the like. The controller 190 controls operation of these various components based on measured and/or modeled parameters.

Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
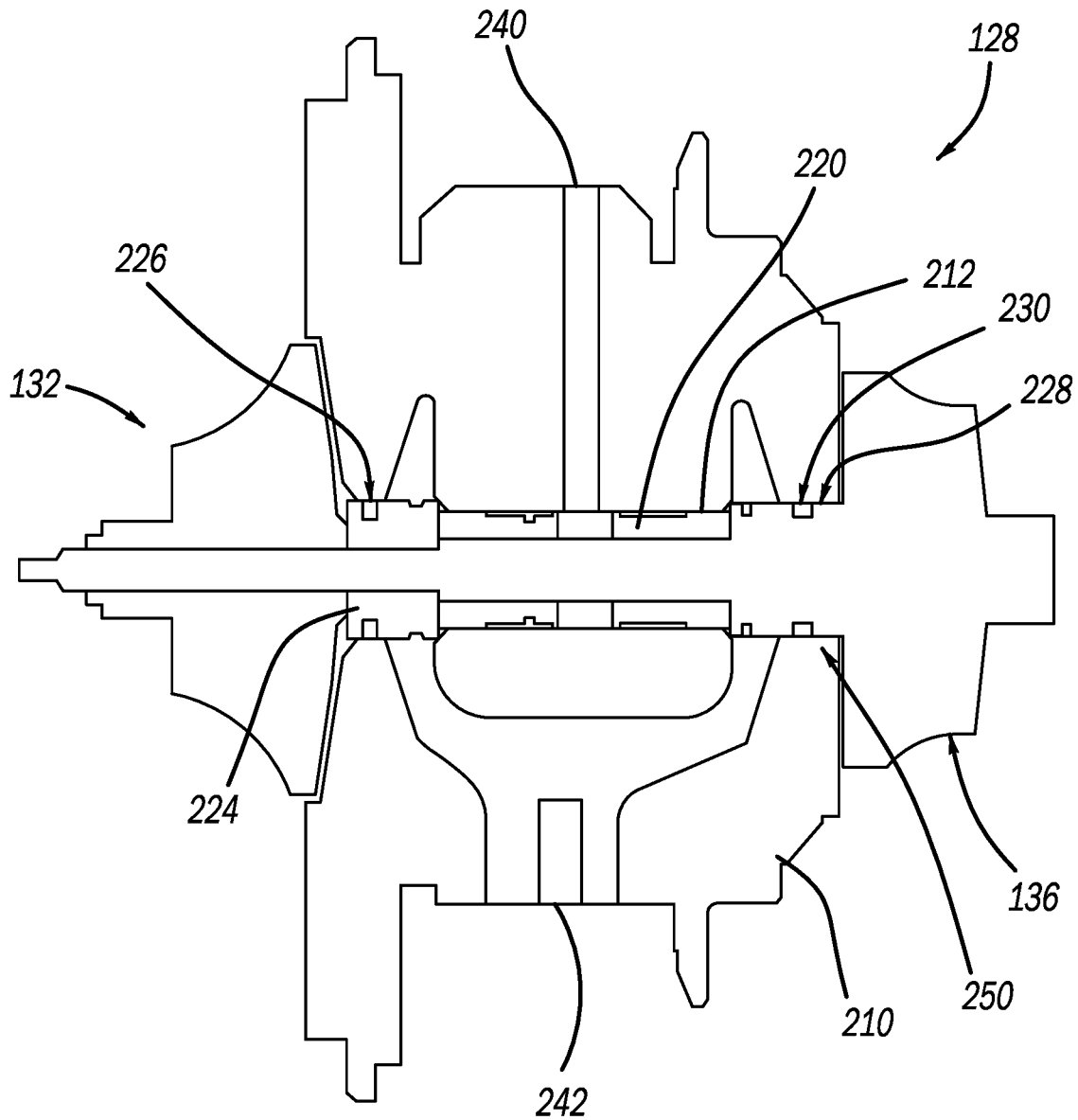
FIG. 2 is a sectional view of the turbocharger of FIG. 1 illustrating an exemplary oil feed and drain according to the principles of the present disclosure.

With additional reference now to FIG. 2, additional features of the turbocharger 128 will be described. The turbocharger 128 includes a turbocharger housing 210 that generally defines a central passage 212 that accommodates a central bearing 220 that receives the shaft 140. A compressor seal assembly 224 is arranged adjacent to the compressor 132. A compressor piston ring seal 226 secures the compressor seal assembly 224 relative to the turbocharger housing 210. A turbine seal assembly 228 is arranged adjacent to, or is integrally formed with, the turbine 136. A turbine piston ring seal 230 secures the turbine seal assembly 228 relative to the turbocharger housing 210.

The turbocharger body 210 further defines an oil supply or feed 240 and an oil drain 242. The locations and orientations of the oil feed 240 and 242 are merely exemplary as shown in FIG. 2 with the appreciation that oil is delivered to and away from the turbocharger 128 for the purposes of lubricating essential components (e.g., the center bearing 220 and the seal assemblies 224, 228). During operation of the CLOC 172, and specifically when the CLOC valve 176 is closed, a vacuum condition can be generated in the turbocharger housing 210. The vacuum condition can result from zero exhaust flow spinning the turbine 136 (and therefore the compressor 132). Such vacuum condition can cause lubrication oil (oil pullover) to be sucked past the turbine seal assembly 228 (and/or the compressor seal assembly 224) along the path generally identified at 250 and into the exhaust system 164 resulting in damage to the aftertreatment system. The techniques described herein mitigate this potential oil leakage condition during CLOC operation.

Figure 3:
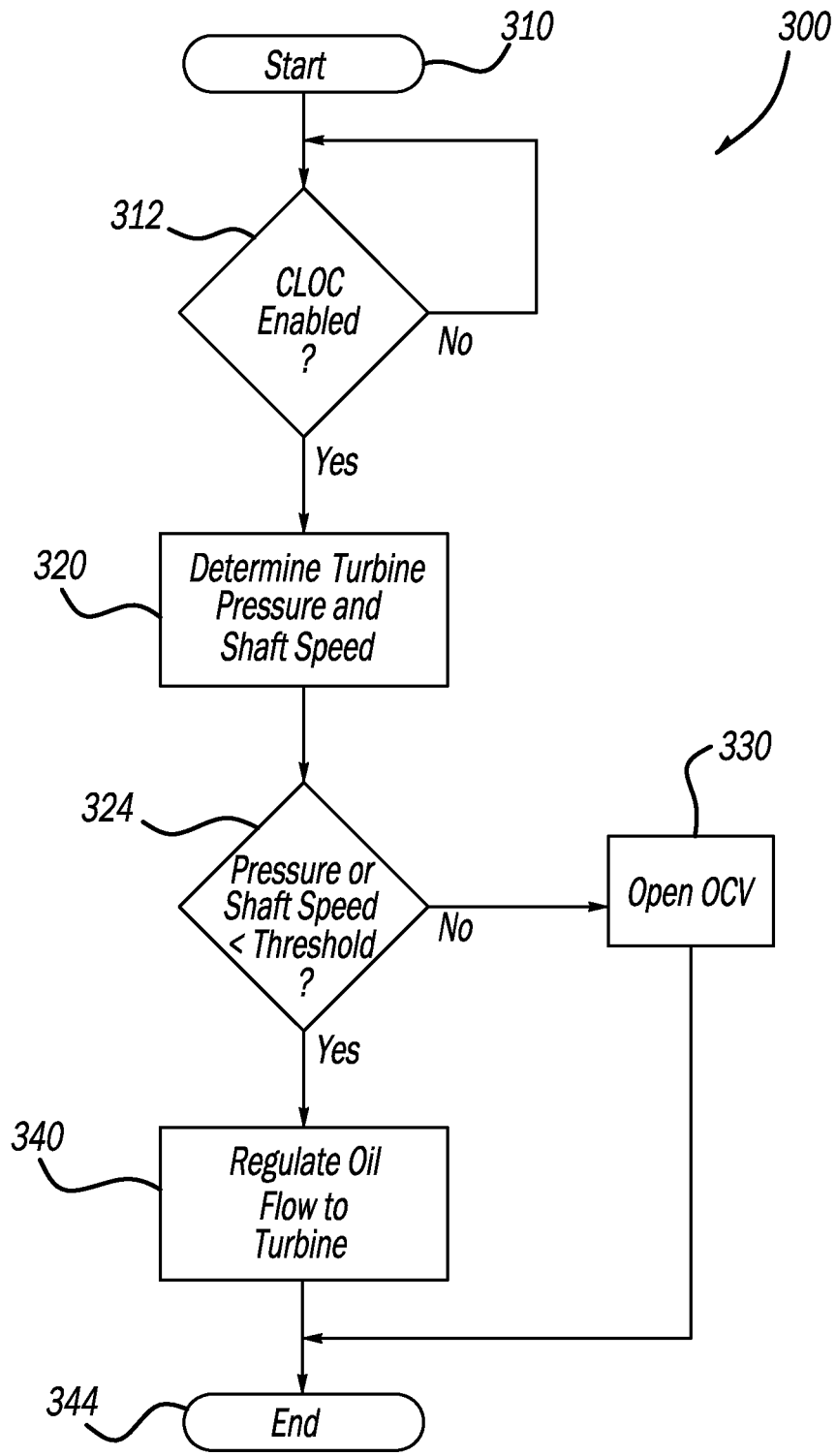
FIG. 3 is a flow diagram of an example method of operating the oil control valve of the turbocharged engine according to the principles of the present disclosure.

Referring now to FIG. 3, a flow chart of an example method 300 of operating the engine 104 having the turbocharger 128, OCV 144, CLOC 172 and CLOC valve 176 is illustrated. For explanatory purposes, components of the vehicle control system 100 will be referenced, but it will be appreciated that this method 300 could be used for any engine having a turbocharger and CLOC. Control starts at 310. At 312, the controller 190 determines whether CLOC is enabled. Again, CLOC operation can be enabled such as at startup of the engine 104 when the main catalyst 184 has not reached optimal operating temperature. At 320 control determines a pressure of the turbine 132 and a speed of the shaft 140.

In examples, the controller 190 can receive a pressure measurement within the turbocharger 128, and a speed of the shaft 140 from the inputs 192, such as from a pressure and speed sensor configured on the turbocharger 128. In other examples, the pressure and speed can be estimated based on other operating conditions. At 324 control determines whether the pressure within the turbocharger 128 or a speed of the shaft is less than a pressure threshold. In examples, a pressure threshold can be indicative of a vacuum condition in the housing 210. If the pressure is not less than the pressure threshold or the speed is not less than a speed threshold, control opens the OCV 144 at 330. If the pressure is less than the pressure threshold or speed is less than a speed threshold, control regulates oil flow (modifying a position of the OCV 144) to the turbocharger 128 at 340. In some examples, the controller can determine a target position of the OCV 144 to mitigate oil leakage from the turbocharger during CLOC operation. The controller commands the OCV 144 to the target position.

In examples, models can estimate the exhaust flow and the turbine pressure to determine whether to regulate the OCV 144. Oil valve characterization can be used to determine the desired position versus oil flow. Oil to the turbocharger 128 can be shut off or regulated to the bearing 220 while in the CLOC mode. Explained further, the controller 190 can send a signal to the OCV 144 to move to an open position, a closed position or any position therebetween based on the measured or estimated pressure in the turbocharger 128. In this regard, control may determine some oil (OCV 144 moved to an intermediate position between open and closed) can be delivered to the turbocharger 128 while still mitigating oil leakage. Control ends at 344.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
    a cold light off catalyst (CLOC) positioned in a bypass passage around a turbine of the turbocharger;
    a CLOC valve that selectively routes exhaust flow from the engine between the turbine and the CLOC;
    an oil control valve that regulates lubrication oil from the engine to the turbocharger; and
    a controller configured to:
        command the CLOC valve to a first position whereby exhaust flow is routed, at least partially, to the CLOC in a CLOC mode;
        determine, based on operation in the CLOC mode, a pressure of the turbine of the turbocharger and a speed of a shaft of the turbine;
        compare the determined pressure and speed to a pressure and speed threshold, respectively;
        determine, based on the comparison, a target position of the oil control valve to mitigate oil leakage from the turbocharger during CLOC operation; and
        command the oil control valve to the target position.

2. The control system of claim 1, wherein the controller is configured to command the CLOC valve to a position wherein all exhaust flow is directed to the CLOC.

3. The control system of claim 1, wherein the controller is further configured to:
    command the oil control valve to an open position based on a determination that the determined pressure is not less than the pressure threshold.

4. The control system of claim 3, wherein the pressure threshold is indicative of a vacuum condition within the turbocharger.

5. The control system of claim 1, wherein the target position comprises a completely closed position wherein oil is precluded from entering the turbocharger from the engine.

6. The control system of claim 1, wherein the target position comprises a partially closed position wherein oil flow entering the turbocharger from the engine is reduced.

7. The control system of claim 1, wherein determining the pressure of the turbine of the turbocharger comprises receiving a signal from a pressure sensor indicative of the pressure of the turbine.

8. The control system of claim 1, wherein determining the pressure of the turbine of the turbocharger comprises estimating the pressure of the turbine based on operating conditions.

9. A method for controlling an engine comprising a turbocharger, the method comprising:
    commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode;
    determining, based on operation in the CLOC mode, a pressure of the turbine of the turbocharger and a speed of a shaft of the turbine;
    comparing the determined pressure and speed to a pressure and speed threshold, respectively;
    determining, based on the comparison, a target position of an oil control valve to mitigate oil leakage from the turbocharger during CLOC operation, the oil control valve regulating lubrication oil from the engine to the turbocharger; and
    commanding the oil control valve to the target position.

10. The method of claim 9, further comprising:
    commanding the CLOC valve to a position wherein all exhaust flow is directed to the CLOC.

11. The method of claim 9, further comprising:
    commanding the oil control valve to an open position based on a determination that the determined pressure is not less than the pressure threshold.

12. The method of claim 11, wherein the pressure threshold is indicative of a vacuum condition within the turbocharger.

13. The method of claim 9, wherein the target position comprises a completely closed position wherein oil is precluded from entering the turbocharger from the engine.

14. The method of claim 9, wherein the target position comprises a partially closed position wherein oil flow entering the turbocharger from the engine is reduced.

15. The method of claim 9 wherein determining the pressure of the turbine of the turbocharger comprises receiving a signal from a pressure sensor indicative of the pressure of the turbine.

16. The method of claim 9, wherein determining the pressure of the turbine of the turbocharger comprises estimating the pressure of the turbine based on operating conditions.

* * * * *